Oct. 16, 1928.                          1,688,210
W. W. SMITH ET AL
STAIR, LADDER, AND THE LIKE
Filed Nov. 3, 1926                 4 Sheets-Sheet 1
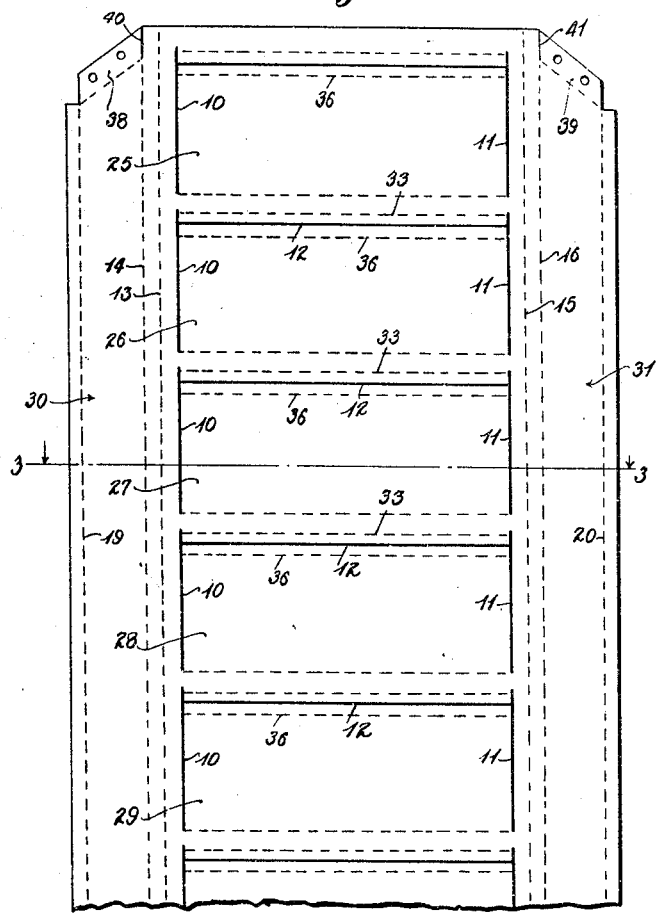
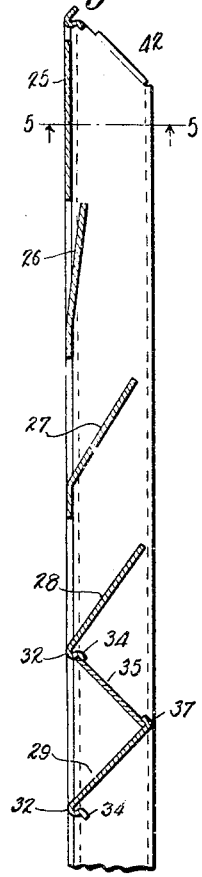
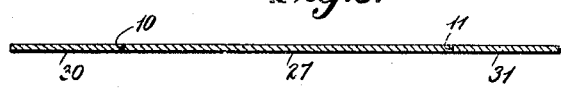
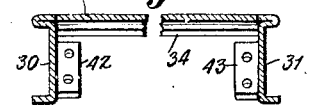
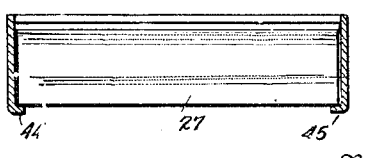
Inventors
Wallace W. Smith
Vernon B. Trevellyan
and Nelson J. Jewett
By
Nelson J Jewett
Attorney

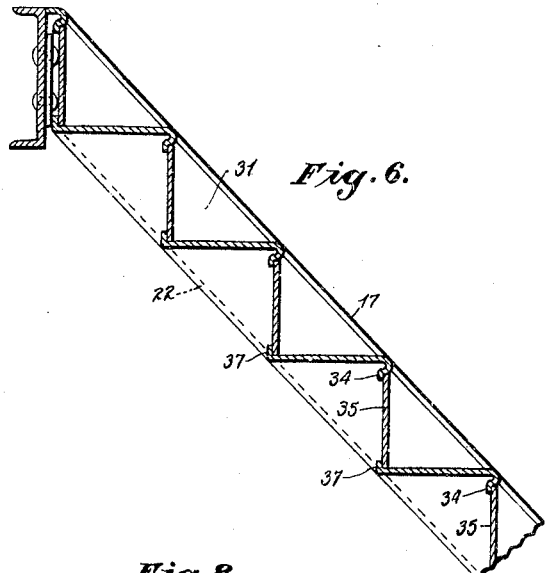
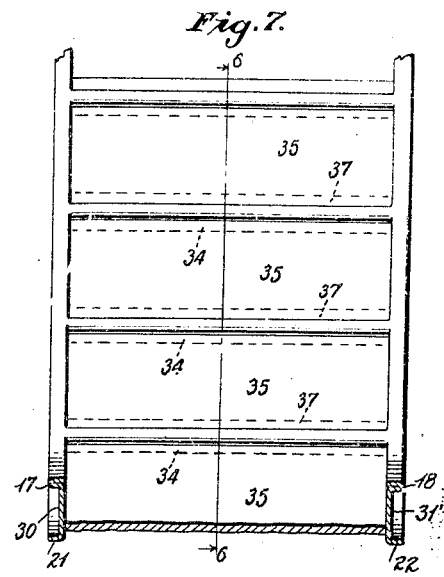
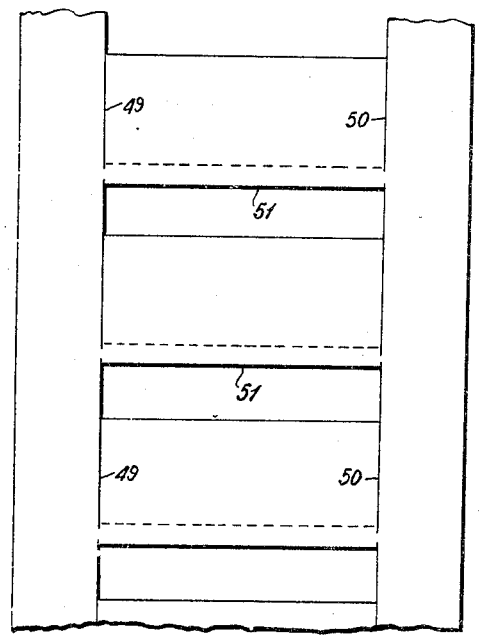
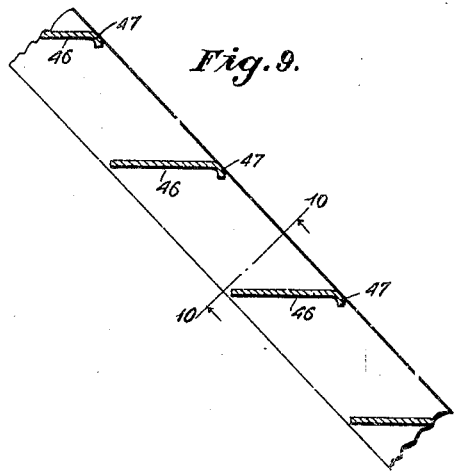
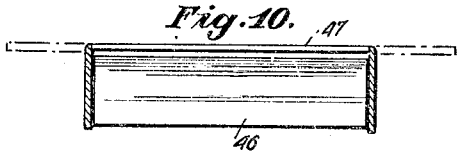

Oct. 16, 1928.

W. W. SMITH ET AL 1,688,210

STAIR, LADDER, AND THE LIKE

Filed Nov. 3, 1926     4 Sheets-Sheet 3

Inventors
Wallace W. Smith,
Vernon B. Trevellyan
and Nelson J. Jewett
By
Nelson J Jewett
Attorneys

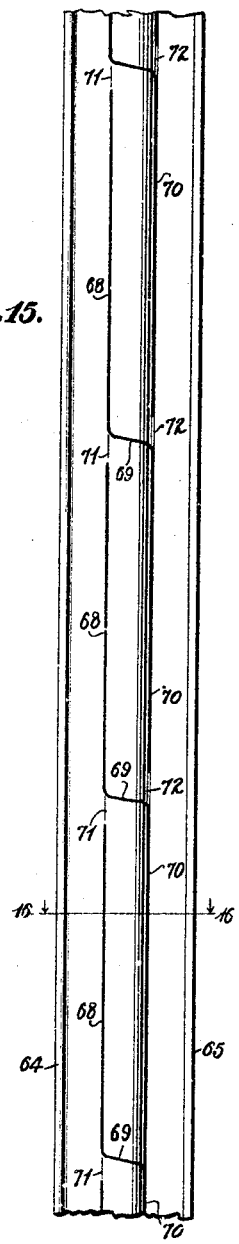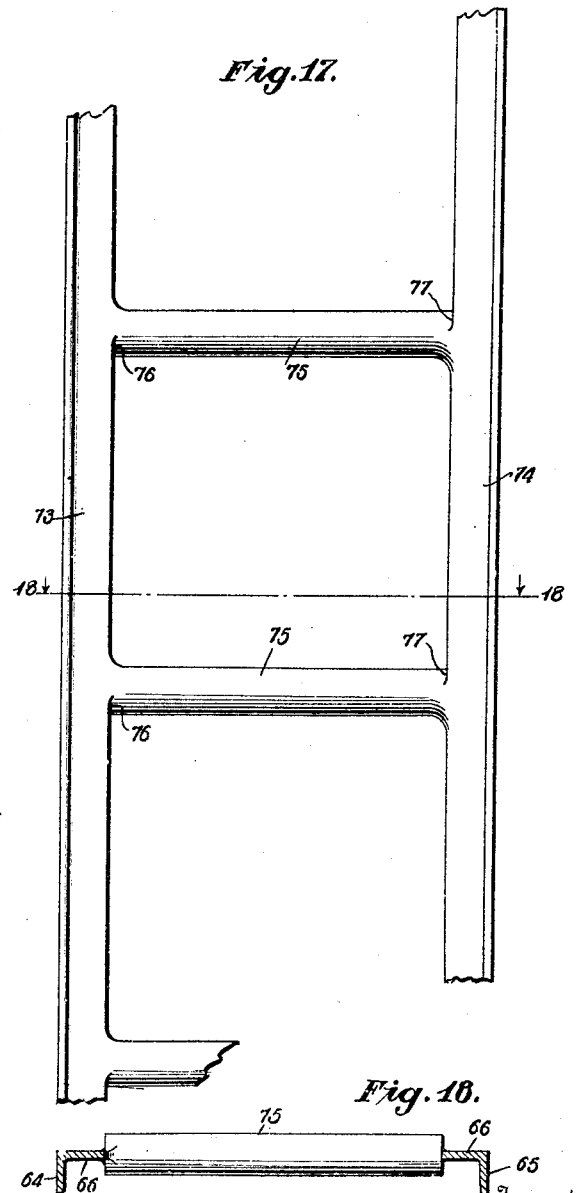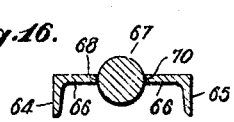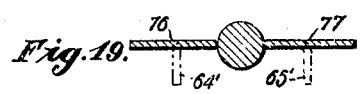

Patented Oct. 16, 1928.

1,688,210

UNITED STATES PATENT OFFICE.

WALLACE W. SMITH AND VERNON B. TREVELLYAN, OF CHICAGO, ILLINOIS, AND NELSON J. JEWETT, OF JEWELL STATION, VIRGINIA.

STAIR, LADDER, AND THE LIKE.

Application filed November 3, 1926. Serial No. 145,984.

The invention relates to stairs, ladders and the like and has as an object the provision of new and improved articles of the character mentioned and a method for producing the same each from a single piece of material.

It is an object of the invention to produce from a single piece of material a flight of stairs or a ladder which will be cheaper to produce and have improved characteristics as a structure.

A further object of the invention is to produce a ladder from a single piece of material by a process of the expanding metal type.

It is a further object of the invention to produce a flight of stairs from a single piece of material without the waste of any important portion of the material.

It is a further object of the invention to provide a process for producing a flight of stairs from a single piece of material with a minimum of labor.

It is a further object of the invention to provide a process of producing a flight of stairs having treads and stringers of pleasing appearance and of great strength from a single piece of material without waste of material.

It is a further object of the invention to provide a process of producing a flight of stairs which can be almost entirely carried out by machinery without labor applied to the assembly thereof.

It is a further object of the invention to provide a process of producing a flight of stairs from material of only sufficient weight to produce the strength necessary in the completed article whereby to reduce the tonnage of the metal required to produce the stairs necessary in an entire building.

It is a further object of the invention to provide a process of producing stairs or ladders which will make it possible to produce these articles at a tonnage cost of production not markedly greater than the tonnage cost of producing the remainder of the steel work for the steel building in which the stairs are to be used.

Illustrative embodiments of the articles provided by the invention and the steps of the process for producing the same are shown in the accompanying drawings wherein:

Fig. 1 is a plan view of a blank for producing a flight of stairs from a single plate showing the fold lines thereof in dash lines and showing the lines of shearing in full lines;

Fig. 2 is a center vertical section of a flight of stairs showing the successive positions occupied by the treads and nosing of the stairs as they are bent out of the plane of the plate and showing in side elevation one of the stringers of the stairs bent to its finished position.

Fig. 3 is a section on line 3—3 of Fig. 1;

Fig. 4 is a transverse section of a flight of stairs showing a modified form of stringer;

Fig. 5 is a detail section on line 5—5 of Fig. 2; the parts being broken away and brought together to reduce the width of the figure;

Fig. 6 is a section on line 6—6 of Fig. 7;

Fig. 7 is an elevation of a flight of stairs of the form shown in Figs. 1 to 5 inclusive;

Fig. 8 is a plan view of a portion of a modified form of blank;

Fig. 9 is a center vertical section of a flight of stairs produced from the blank of Fig. 8;

Fig. 10 is a transverse section on line 10—10 of Fig. 9;

Fig. 15 is a plan view of a blank for producing a ladder;

Fig. 16 is a transverse section on line 16—16 of Fig. 15;

Fig. 17 is a plan view of the portion of a ladder produced from the blank of Fig. 15;

Fig. 18 is a transverse section on line 18—18 of Fig. 17; and

Fig. 19 is a transverse section of a modified form of ladder stock.

Figure 11:
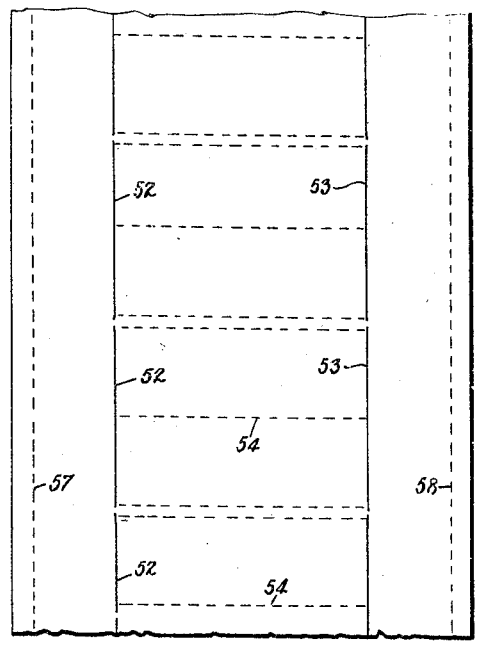
Fig. 11 is a plan view of a still further modified form of blank.

In the manufacture of stairs and ladders as heretofore practiced, it has been necessary to provide a plurality of elements of the structure required of the proper form and dimensions and by hand labor to assemble the structure desired with a result that when an order is received for the steel for a building including stairs or ladders as a necessary part of the order, the tonnage production of the factory filling the order has dropped very greatly during the time that the stairs or ladders were being produced making these portions of the building very much more expensive per ton than the remainder of the building.

By the provision of the process and articles provided by the present invention, it is possible to produce these portions of the building at a cost not markedly greater than the cost of the remaining steel for the building. To this end for the production of a flight of stairs from a single piece of material, the blank of Fig. 1 may be provided comprising a single plate of steel which when manipulated according to the process of the invention will produce a flight of stairs without any important waste.

In the manufacture of stairs as heretofore practiced, in order to provide stringers for the stairs of the desired channel cross section, it was necessary to use stock channels, and all forms of stock channels have been unnecessarily heavy for this purpose. It was therefore necessary to use a greater weight of steel than that actually required for the purpose. By the provision of the present invention, only the weight of steel necessary to carry the load may be used by choosing a thickness for the plate shown in Fig. 1 as desired, and plate steel may be had in any desired thickness within reasonable limits.

As shown in Fig. 1 the plate of steel is slitted or sheared along the lines 10, 11, and 12, and is subsequently folded along the lines 13, 14, and 15, 16, to produce the upper flanges 17, 18 of a stringer for the stairs as shown in Fig. 7. The sheet is also folded along lines 19, 20 to produce the lower flanges 21, 22 shown in Fig. 7.

The plates 25, 26, 27, 28, 29, are also bent out of the plane of the plate of Fig. 1, as shown in the successive positions of Fig. 2, to provide the treads of the stairs, the ends of the plates thus bent coming into contact with the web of the channel formed by the sides of the plate shown at 30, 31 in Fig. 7 and may be secured thereto by line welding.

The portions of the center of the plate of Fig. 1 which is left integral with the sides thereof is shown in the lower portion of Fig. 2 as bent into a rounded nosing 32 and the portion of the nosing which is freed from the sides of the plate by virtue of the fact that the slits 10 and 11 extend a short distance beyond the slits 12 is folded along the fold line 33 to produce a depending lip 34 shown in Fig. 2 and against which a separate plate 35 may be inserted if it be desired to add risers to this form of stairs.

To receive the lower edges of such risers, the plates 25 to 29, inclusive may be turned up along the fold lines 36 to provide the lip 37. It will be seen that a complete and operative flight of stairs is thus produced from a single piece of material without the interposition of the risers 35, these risers only being necessary when a finished appearance is desired to be given to the flight of stairs.

To provide for the attachment of the stairs to the frame of the building in which they are to be installed, the top and bottom, the top only being illustrated, are formed in the manner shown in Figs. 1 and 2, wherein the end of the plate throughout the portion thereof which forms the treads and the top flanges 17, 18 of the stringers is left square and wherein a portion 38, 39 is cut at an angle and severed by slits 40, 41 from the body of the plate. The thus freed portions of the material forming the webs of the flanges of the stringers are then bent to the position shown in Fig. 5 to provide the attaching ears 42, 43 which may be perforated and attached to the header of the stairway with which the stairs are to be assembled.

The lower end of the stairway will be formed with like ears attachable to the floor from which the stairs are to rise, these ears falling into a plane parallel with the treads 25–29 inclusive. The complete stairway thus produced with the risers 35 in position is shown in sections and plan view respectively in Figs. 6 and 7.

A modified form of stringer is shown in Fig. 4 in which a plate such as shown in Fig. 1 without the fold lines 13, 14, 15, 16, has its side portions bent downwardly along the line of slits 10, 11, and has the side portions along lines 19, 20 folded inwardly to produce the bottom flanges 44, 45.

The treads and their lips in this form may be the same as that shown in Figs. 1–5, 6 and 7 and the stairs thus produced will not be provided with upper flanges upon the stringers. The same width of treads may thus be provided in this form with a less over-all width of stairs.

As shown in Figs. 8, 9, and 10, a flight of stairs is produced having only plain side stringers and treads 46 with rounded nosings 47 and which are adapted to be produced from the blank shown in Fig. 8 having slits 49, 50, and 51. In this form of material, it may be necessary to waste portions of the tread plates at their free edges, if the pitch so requires, it being understood that the treads of this form of device will be line welded to the stringers thereof in the manner already described by the first described form of the invention.

Figure 12:
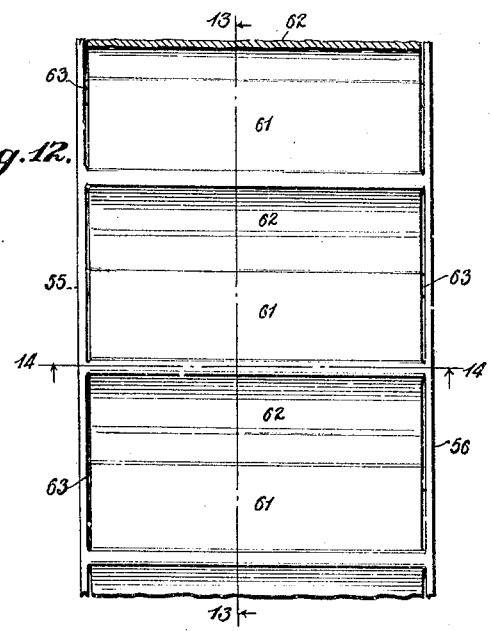
Fig. 12 is a plan of a flight of stairs produced from the blank of Fig. 11.
Figure 13:
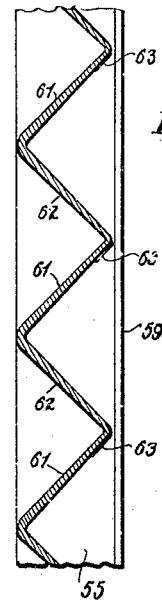
Fig. 13 is a section on line 13—13 of Fig. 12.
Figure 14:
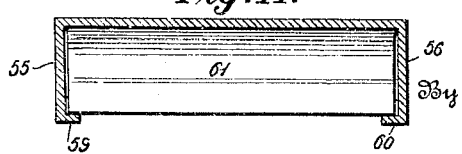
Fig. 14 is a transverse section on line 14—14 of Fig. 12.

In Figs. 11 to 14, inclusive, the plate shown in Fig. 11 from which the stairs are to be produced is slitted along lines 52, 53, the plate is then heated and the material freed by the slits is stretched about the fold lines 54 and deflected from the plane of the plate in the manner illustrated in Figs. 12, 13, whereby treads and risers are produced from the body of the plate.

To produce this form of stairs it may be necessary to subject the plate to a plurality of heating and stretching processes resulting in a thinning of the plate in the portions indicated in Figs. 12 and 13, until the deflected portions reach the position shown. In this form of the invention the plate shown in Fig. 11 has its side portions bent downwardly along the line of slits 52, 53, to provide the stringer portions 55, 56 shown in Fig. 14 and the edges of the plates are folded along the lines 57, 58 to the position shown in Fig. 14 forming the lower flanges 59, 60 shown in such figure standing under the thin portion at the juncture of the treads 61 and the risers 62 of this form of the invention. At this thin portion, the treads are desirably line welded to the side stringers 55, 56 as indicated at 63 in Fig. 13.

If desired, the material forming the flanges 34 of Figs. 1–7 or 47 of Fig. 9 may be turned upwardly to enclose the front edge of initially plastic tread material which it may be desired to use as a finish for the stair treads.

To produce a ladder according to the present invention, a special form of steel is rolled to the form shown in cross section in Fig. 16, which steel is generally channel shaped in cross section having flanges 64, 65 and a web 66. The center portion of the web 66 is rolled with a rounded enlargement 67. The thus formed channel member is then slitted along the lines 68, 69, 70, being left integral with the flange member 66 at points 71, 72. The thus slitted channel member is then subjected to an expanding metal operation whereby the side members 73, 74 of a complete ladder are separated from each other and the rounded portions 67 are brought into parallel positions shown at 75, Fig. 17, to provide round rungs of a ladder extending between the angle side members thereof. If desired, the thus formed ladder may be spot welded at the points 76, 77.

A modified form of ladder stock is shown in Fig. 18 comprising a flat plate having the thickened central portion 67' for production of the rungs which may be slitted in the manner shown in Fig. 15 and which may be turned downwardly along lines at 76, 77 into the dotted line position of said figure to provide the portions 64' and 65'.

The production of this form of ladder will be seen to be entirely machine work and any length of ladder within the limits of available steel stock of Fig. 16 or 17 may be produced by merely running the stock through the necessary machinery to carry out the process.

In furtherance of one of the objects of the invention, as shown, each of the parts of each structure is so proportioned and arranged with respect to the remaining parts that the whole structure is produced from a continuous piece of material or blank, without openings from which material is cut to waste. By "continuous" blank in the claims is meant that the blank or piece of material from which the structure is produced by slitting and distortion is without such openings as result in waste.

Minor changes may be made in the physical embodiment of the invention or in the steps of the process within the scope of the appended claims without departing from the spirit thereof.

We claim:

1. A structure of the class described comprising side supporting members and tread members connecting said supporting members and integral therewith at a portion of each of the ends of the tread members, said members being formed from a continuous blank by slitting and distortion only so that substantially no material of the blank is discarded.

2. A structure of the class described comprising spaced supporting stringers, parallel tread members integral at a portion of each of their ends with one of said stringers and occupying spaced parallel planes, portions of said tread members falling between said stringers and being enclosed thereby.

3. A stair comprising in combination, spaced supporting stringers, tread members each integral at one portion of each end with a portion of said stringers, said tread members each having an upwardly projecting flange upon its inner edge and a downwardly projecting flange upon its nose, and risers between said stringers and in contact with the flanges of the adjacent tread members.

4. A stair comprising in combination, spaced supporting stringers having inwardly directed flanges upon their lower edges, spaced tread members integral at each of their ends at one portion thereof with a portion of said stringers, said tread members occupying spaced parallel planes and being enclosed between said stringers and having an edge of each resting upon said inwardly directed flanges.

5. A stair comprising in combination, spaced supporting stringers, integral tread and riser members, each integral at one portion of the ends thereof with a portion of said stringers, one each of said tread and riser members integral at one edge, said integral edge falling between said stringers.

6. A stair comprising in combination, spaced stringers, each comprising an upper flange of sheet material folded upon itself, a web member integral with the lower portion of said flange, spaced tread members occupying parallel planes, each tread member integral at a portion of each of its ends with a portion of the upper portion of said flange, said tread members being enclosed at their ends between said webs.

7. A stair formed from an initially flat sheet of material having tread members severed therefrom except at the nosings thereof by slits intermediate the margins of the sheet, said margins turned into parallel planes perpendicular to the common plane of said nosings to provide supporting stringers and said tread members bent out of the initial plane of the sheet to positions in parallel planes between said stringers, the ends of said tread members secured to said stringers.

8. A stair formed from an initially flat sheet of material having tread members severed therefrom except at the nosings thereof by slits intermediate the margins of the sheet, said margins turned into parallel planes perpendicular to the common plane of said nosings to provide supporting stringers and the edges of the sheet turned into a plane parallel to said common plane to provide edge flanges upon said stringers, said tread members bent into parallel planes to positions between said stringers and having their ends secured to the inner surfaces of said stringers.

9. A stair formed from an initially flat sheet of material having treads and risers each integral at one edge with the adjacent riser and tread, said treads and risers severed from the sheet except at the nosings thereof by slits intermediate the margins of the sheet, said margins bent into spaced parallel planes perpendicular to the common plane of the nosings to provide supporting stringers, said treads and risers bent to positions between said stringers.

WALLACE W. SMITH.
VERNON B. TREVELLYAN.
NELSON J. JEWETT.